US006615438B1

(12) United States Patent
Franco et al.

(10) Patent No.: US 6,615,438 B1
(45) Date of Patent: Sep. 9, 2003

(54) WINDSHIELD DE-ICING

(75) Inventors: Shlomi Franco, Tel Aviv (IL); Jossef Wodnik, Herzliya (IL); Vyshislav Ivanov, Kiryat Tivon (IL)

(73) Assignee: Micro-Heat Inc., New York, NY (US)

( * ) Notice: Subject to any disclaimer, the term of this patent is extended or adjusted under 35 U.S.C. 154(b) by 0 days.

(21) Appl. No.: 09/509,453

(22) PCT Filed: Jun. 24, 1998

(86) PCT No.: PCT/US98/13023

§ 371 (c)(1),
(2), (4) Date: Aug. 3, 2001

(87) PCT Pub. No.: WO98/58826

PCT Pub. Date: Dec. 30, 1998

Related U.S. Application Data

(60) Provisional application No. 60/076,730, filed on Mar. 4, 1998.

(30) Foreign Application Priority Data

Jun. 24, 1997 (IL) .................................................. 121159
May 3, 1998 (IL) .................................................. 124299

(51) Int. Cl.[7] ................................................. B60S 1/02
(52) U.S. Cl. ............................... 15/250.02; 15/250.01; 15/250.05; 239/284.1; 239/135; 239/128
(58) Field of Search .................. 15/250.01, 250.02, 15/250.04, 250.05; 239/284.1, 130, 131, 135, 139, 284.2, 128, 132.1; 134/18

(56) References Cited

U.S. PATENT DOCUMENTS

| 1,636,190 A | 7/1927 | Mahonev |
| 4,090,668 A | 5/1978 | Kochenour |
| 4,877,186 A | 10/1989 | Scholl |
| 5,118,040 A | 6/1992 | Abe |
| 5,383,247 A | 1/1995 | Nickel |
| 5,509,606 A | 4/1996 | Breithaupt et al. |
| 5,553,094 A | * 9/1996 | Johnson et al. ............. 375/130 |
| 5,784,751 A | 7/1998 | Tippets |

FOREIGN PATENT DOCUMENTS

| GB | 1451666 A | 10/1976 |
| JP | 63093652 A | 4/1988 |
| JP | 2053656 A | 2/1990 |
| JP | 2234866 A | 9/1990 |

* cited by examiner

Primary Examiner—Robert J. Warden, Sr.
Assistant Examiner—Shay Balsis
(74) Attorney, Agent, or Firm—Gottlieb, Rackman & Reisman, P.C.

(57) ABSTRACT

Apparatus (20) for cleaning a window (24) of a vehicle (22), including a vessel (28), having an inlet (32) through which a washing fluid is received from a reservoir and an outlet (34) through which the fluid is discharged for cleaning the window. There is a heating element (50) for heating the fluid in the vessel, which element preheats the vessel before the washing fluid is received therein, whereby at least an initial quantity of the fluid is rapidly heated and discharged from the vessel.

11 Claims, 12 Drawing Sheets

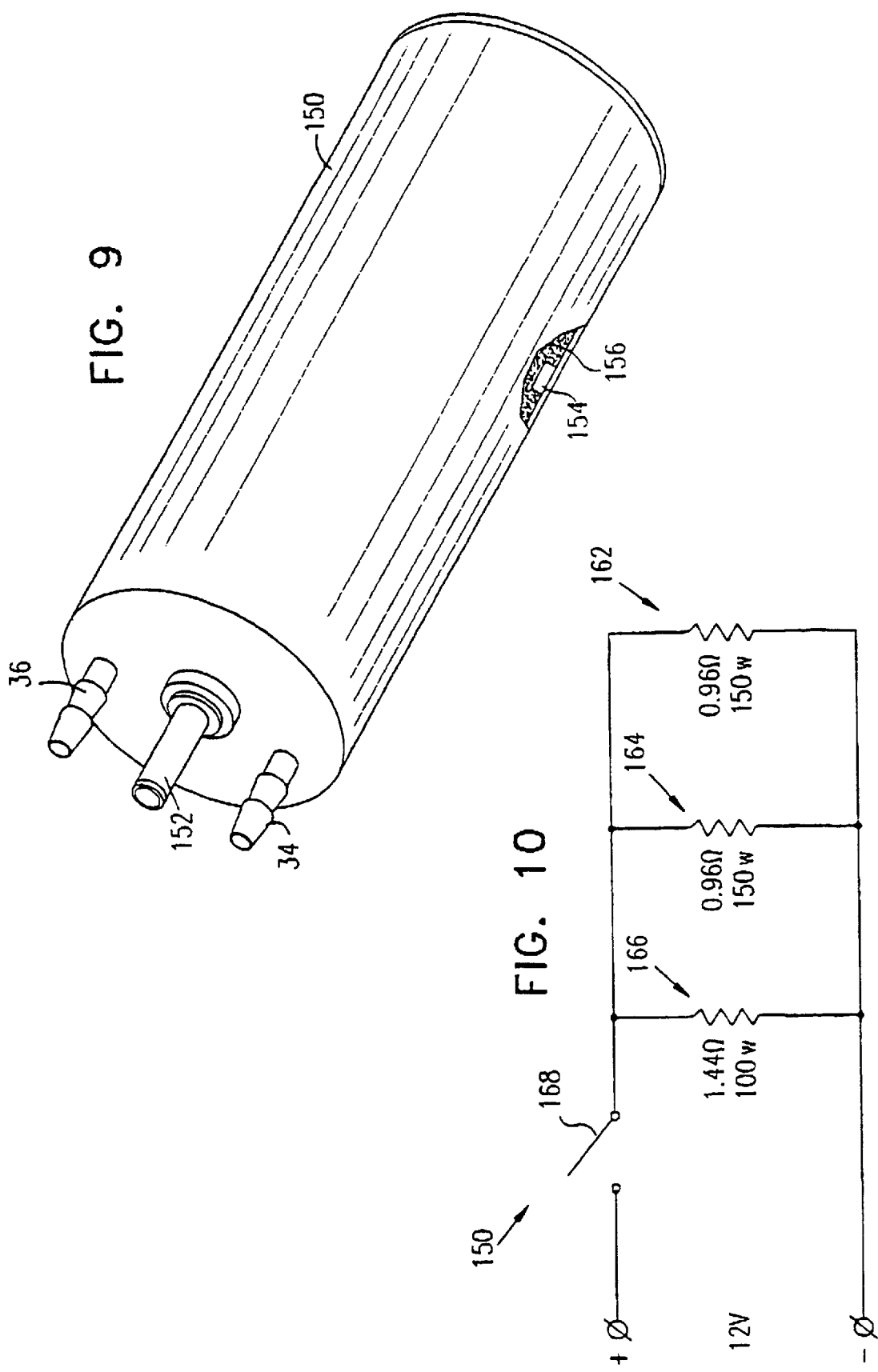

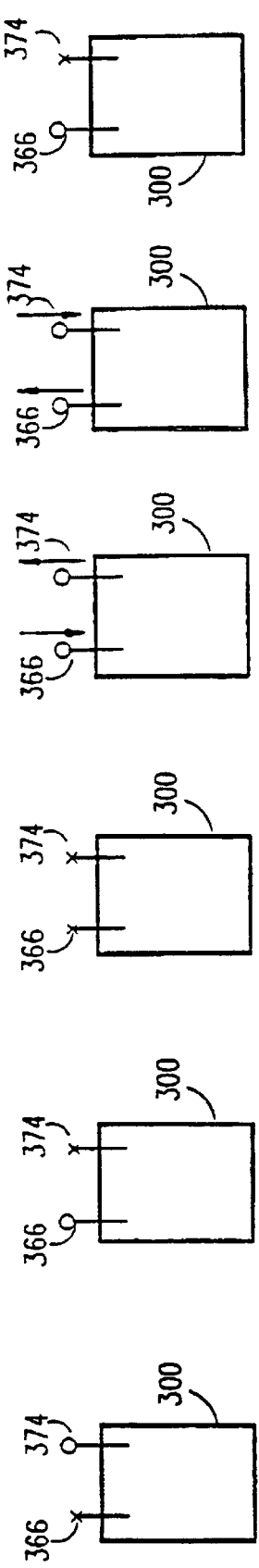
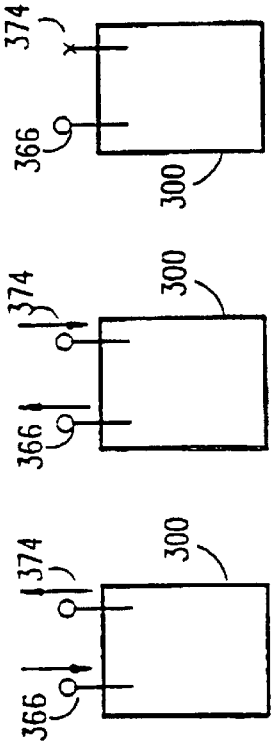
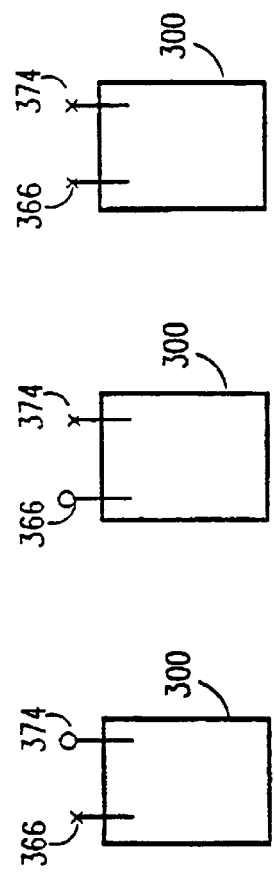
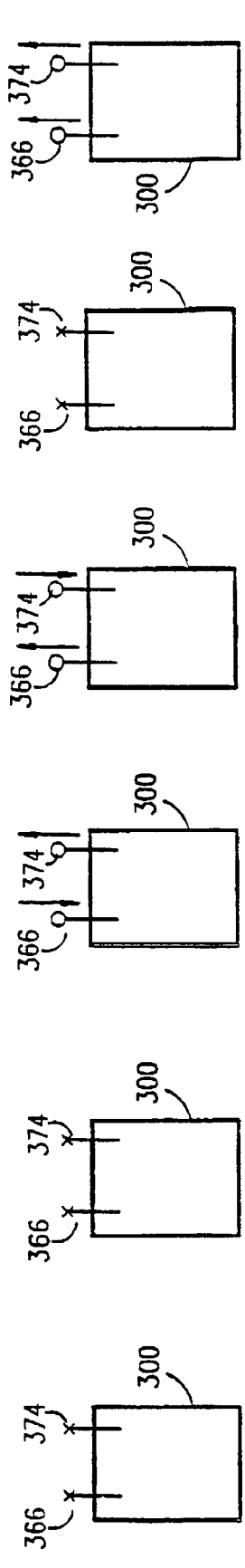

WINDSHIELD DE-ICING

RELATED APPLICATIONS

This application claims the benefit of U.S. Provisional Patent Application No. 60/076,730, filed Mar. 4, 1998 which is assigned to the assignee of the present patent application and incorporated herein by reference.

FIELD OF THE INVENTION

The present invention relates generally to fluid heating, and specifically to heating of a fluid for the purpose of cleaning or de-icing an automobile window.

BACKGROUND OF THE INVENTION

Various methods and devices are known in the art for providing a spray of heated water or other washing fluid onto the windows of a vehicle. The heated fluid is particularly advantageous in removing ice from the vehicle windshield in cold weather. This ice removal function requires that a driver of the vehicle wait while the fluid is heated, before the windshield can be de-iced. Methods and devices known in the art are impractical for this purpose, however, since they typically use heat or electricity generated by the vehicle engine itself to heat the fluid, requiring the driver to wait an unacceptably long time for the fluid to reach a suitable temperature.

Using the vehicle battery to heat the fluid, independent of the vehicle engine, is also problematic because of the large current draw required to heat a sufficient quantity of fluid to effectively de-ice the windshield. The battery cannot typically provide sufficient current to heat the vehicle's entire reservoir of washing fluid in a reasonable amount of time. Although methods and devices have been suggested for heating the fluid on-line, as it is about to be sprayed on the windshield, the battery also cannot provide enough current to heat a spray of sufficient volume to a high enough temperature to achieve effective de-icing.

U.S. Pat. No. 5,509,606 describes a hot wash device for an automobile windshield, which includes a container into which washing fluid from a reservoir is pumped and in which the fluid is heated by an electrical heating element before it is sprayed onto the windshield. The container is insulated and includes a thermostat that is used to ensure that the temperature of the fluid does not exceed a predetermined maximum. The container is kept full, with heat applied as needed to bring the cold fluid pumped into the container up to the desired temperature.

U.S. Pat. No. 5,118,040 describes electric apparatus for washing window glass of a vehicle. An insulated container is positioned between a reservoir of cold washing fluid and spray outlets to the vehicle window, in a position lower than the reservoir so as to be kept full of fluid. When the vehicle ignition is turned on, an electric heater heats the fluid in the container and remains active while the vehicle is in use. There is no provision, however, for rapid start-up and heating to de-ice the vehicle window.

U.S. Pat. No. 4,090,668 describes a windshield washing and deicing system which includes a reservoir having a sealed container therein. A pump transfers washer fluid from the reservoir to the container and from the container to a plurality of nozzles. Heated engine coolant is passed through a conduit in the reservoir. Electrical resistance wire heats the fluid in the container whenever the temperature drops below a certain minunum. Solenoid valves direct the spray from the tank to the front or rear window of the vehicle, but there is no suggestion of using the valves for any other fluid control purposes.

U.S. Pat. No. 5,012,977 describes a vehicle window washer in which washer fluid in a reservoir is heated, and in which a pump for spraying the fluid on the vehicle window has a variable outlet pressure. The temperature of the fluid in the reservoir is sensed, and the pump outlet pressure is varied accordingly in an inverse manner with temperature of the washer fluid, so as to maintain a more consistent fluid deposit on the window, as the fluid viscosity changes with temperature.

U.S. Pat. No. 5,354,965 describes a system for electrically heating a volume of windshield cleaning fluid in a motor vehicle. A vessel is filled with the volume of fluid to be heated, using PTC thermistors or other electrical heating elements. A control circuit regulates the length of time that the fluid is heated, in accordance with a prevailing ambient temperature, before the fluid is sprayed on the windshield. The circuit also prevents operation of the fluid heating when the vehicle engine is not running.

SUMMARY OF THE INVENTION

It is an object of the present invention to provide improved apparatus and methods for cleaning or de-icing a vehicle window.

It is a further object of some aspects of the present invention to provide apparatus and methods that enable rapid start-up of de-icing of a vehicle window.

In preferred embodiments of the present invention, a vessel is provided for heating a washing fluid before the fluid is discharged toward a window of a vehicle. Before the fluid is introduced into the vessel, the vessel is preheated, preferably by passing an electrical current through a heating element in the vessel for about one minute or less. When preheating is completed, the fluid is allowed into the vessel and is rapidly heated by contact therewith, leading to an increase in pressure in the vessel due to vaporization of a portion of the fluid. The fluid is then discharged at a desired temperature and pressure so as to clean and/or de-ice the window.

Although the preheating of the vessel draws only a moderate electrical input from the vehicle battery, it enables a sufficient quantity of hot fluid to be generated for de-icing the window before starting the vehicle more rapidly than in any practical window cleaning system known in the art. Moreover, the pressure generated by vaporization of the fluid helps to clear ice or other blockages that may have formed in tubing or nozzles through which the fluid is sprayed onto the window. It is also noted that spraying the heated fluid on the window's exterior surface effectively defogs its interior surface, as well.

In some preferred embodiments of the present invention, after an initial quantity of the fluid has been heated and discharged from the vessel, a further quantity is introduced into the vessel and immediately heated. Once the further quantity has reached a desired temperature, it too is discharged, preferably after a delay of several seconds. This process continues for repeated heat/discharge cycles, until the window has been completely cleaned and de-iced. Preferably, the heat/discharge cycles are timed in a sequence whose parameters, such as discharge duration and intervals between discharges, are varied in accordance with ambient temperatures of the vehicle and the unheated fluid.

It will be understood that the term "vehicle" as used in the context of the present patent application and in the claims can refer to any type of wheeled vehicle having windows, such as an automobile or truck, as well as to a boat or airplane. Furthermore, the term "window," although typically referring to the windshield of a vehicle, can refer to any transparent surface, including side and rear windows and outer mirrors, as well as covers of headlights and the like. In addition, whenever the term "cleaning" is used in the present application and in the claims in reference to an action involving spraying heated fluid on a window, the term will be understood to comprehend de-icing, as well. Those skilled in the art will appreciated that the principles of the present invention may be adapted for cleaning and de-icing other surfaces, including internal windows and mirrors, for example, as well as for supplied heated water and fluid for other purposes.

There is therefore provided, in accordance with a preferred embodiment of the present invention, apparatus for cleaning a window of a vehicle, including:

a vessel, having an inlet through which a washing fluid is received from a reservoir and an outlet through which the fluid is discharged for cleaning the window; and a heating element for heating the fluid in the vessel, which element preheats the vessel before the washing fluid is received therein, whereby at least an initial quantity of the fluid is rapidly heated and discharged from the vessel.

Preferably, the vessel is at least partly drained of fluid held therein before the element preheats the vessel, wherein the vessel includes a drain valve, actuated in cooperation with operation of the heating element, through which the vessel is at least partly drained. Preferably, the drain valve includes a one-way valve. Further preferably, the fluid drains into the reservoir, substantially irrespective of the height of the reservoir relative to the vessel.

Preferably, the apparatus includes a pump, which conveys the fluid from the reservoir to the vessel after the element preheats the vessel, wherein the pump and the reservoir are preferably part of a pre-existing window cleaning system in the vehicle, into which the vessel and heating element are retrofitted. Alternatively, the entire apparatus may be produced as an integral unit, including the pump. Preferably, the rapid heating of the initial quantity of the fluid causes the fluid to be discharged at a pressure substantially higher than a pressure generated by the pump at the inlet of the vessel.

Preferably, the apparatus includes one or more valves, which regulate passage of fluid through the vessel responsive to operation of the heating element, wherein the one or more valves open and close in cooperation with operation of the heating element. Preferably, the one or more valves include a solenoid valve or alternatively, a hydraulic, pneumatic or vacuum-operated valve. At least one of the one or more valves is preferably fixed to the inlet of the vessel or, alternatively or additionally, to the outlet of the vessel, wherein the at least one valve fixed to the outlet opens responsive to a pressure increase in the vessel, due to contact between the fluid and the preheated vessel.

In a preferred embodiment, the apparatus includes one or more temperature sensors, which generate signals responsive to an operating temperature of the apparatus, and a controller, which receives the signals and regulates discharge of the fluid from the vessel responsive thereto. Preferably, after the initial quantity of the fluid is discharged, one or more additional quantities of fluid are refilled into the vessel and discharged therefrom intermittently, responsive to the temperature signals, wherein the quantities are discharged when the temperature signals indicate that the temperature of the fluid in the vessel is above a predetermined threshold, and the discharge is interrupted when the temperature of the fluid falls below the threshold. Alternatively or additionally, the quantities are controlled according to a predetermined timing sequence, which is selected responsive to the temperature signals, and the temperature threshold may vary among the quantities in the sequence.

In another preferred embodiment, the controller analyzes the signals to detect a malfunction of the apparatus and interrupts operation of the heating element when the malfunction is detected.

Preferably, at least one of the one or more temperature sensors is inside the vessel. The at least one sensor is preferably substantially immersed in the fluid in the vessel. Alternatively, the at least one sensor is positioned so as to be substantially out of the fluid in the vessel while the heating element preheats the vessel. Preferably, operation of the heating element is interrupted when the temperature inside the vessel exceeds a predetermined maximum.

In a preferred embodiment, at least one of the one or more temperature sensors is fixed on an outer surface of the vessel. Additionally or alternatively, at least one of the one or more temperature sensors is fixed to the reservoir or on an outer surface of the vehicle, most preferably on an outer surface of the window to be cleaned, covered by an at least partially reflective cover, so as to substantially neutralize the effect of solar radiation thereon. Preferably, the fluid in the vessel is heated to a temperature which is varied responsive to the signals generated by the at least one sensor fixed on the outer surface of the vehicle, or otherwise responsive to a temperature outside the vehicle.

Preferably, the vessel includes an inner compartment communicating with the outlet, in which compartment the heating element is positioned, and an outer compartment, generally surrounding the inner compartment, communicating with the inlet. Preferably, the vessel includes an insulating outer envelope substantially surrounding the outer compartment and a all between the inner and outer compartments, which is preheated by the heating element. Alternatively, the outer compartment is surrounding by one or more additional fluid compartments, external thereto.

Preferably, the apparatus includes a pressure relief valve.

Further preferably, the apparatus includes a bypass line, bypassing the vessel, through which the fluid is conveyed to clean the window without heating the fluid, wherein when cleaning of the window is required while the element is preheating the vessel, the fluid is diverted through the bypass fine. Preferably, an operator of the vehicle selects whether the heating apparatus is to be actuated, such that when the apparatus is de-actuated, fluid is conveyed through the bypass. Further preferably, the apparatus automatically switches between conveying the fluid through the vessel and through the bypass, responsive to a heating cycle of the vessel. When fluid is not available from the vessel, unheated fluid is, preferably, automatically conveyed through the bypass line.

In a preferred embodiment, the apparatus includes a remote input device, which is actuated by a user of the vehicle to initiate preheating of the vessel before starting the vehicle.

Preferably, the heating element includes a resistive heating wire. Alternatively or additionally, the heating element conveys heat from a heat source in the vehicle to the fluid in the vessel.

There is also provided, in accordance with a preferred embodiment of the present invention, apparatus for cleaning a window of a vehicle, including:

a vessel, having an inlet through which a washing fluid is received from a reservoir and an outlet through which the fluid is discharged for cleaning the window;

a heating element for heating the fluid in the vessel;

a temperature sensor, which senses a temperature in the vessel; and a valve for controlling flow of the fluid through the vessel, which intermittently releases quantities of the fluid through the outlet at a desired temperature, responsive to the temperature sensed by the sensor.

Preferably, a windshield wiper is activated intermittently to clean the window responsive to the intermittent release of the fluid.

Preferably, the apparatus includes a controller, which regulates the intermittent release of the fluid according to a given timing sequence, preferably a predetermined or programmable sequence, wherein the timing sequence is varied responsive to an ambient temperature in the vehicle or, alternatively or additionally, to a temperature of an outer surface of the window.

Preferably, an initial quantity of the fluid is released at a substantially higher pressure than subsequent quantities.

There is further provided, in accordance with a preferred embodiment of the present invention, a method for cleaning a window of a vehicle using a washing fluid, including:

preheating a vessel;

introducing a quantity of the fluid into the preheated vessel, whereby the temperature and pressure of the fluid are elevated; and discharging the fluid onto the window at the elevated temperature and pressure.

Preferably, the vessel is drained of fluid before preheating the vessel.

Further preferably, introducing the fluid includes pumping the fluid into the vessel at a pump pressure, wherein the elevated pressure at which the fluid is discharged is substantially greater than the pump pressure.

In a preferred embodiment, the method includes measuring a temperature of the fluid, wherein discharging the fluid includes controlling the fluid discharge responsive to the temperature measurement. Additionally or alternatively, a temperature of an outer surface of the vehicle is measured, wherein discharging the fluid includes controlling the fluid discharge responsive to the temperature of the outer surface.

There is moreover provided, in accordance with a preferred embodiment of the present invention, a method for cleaning a window of a vehicle using a washing fluid, including repeating a plurality of times in sequence the steps of:

heating a quantity of the fluid;

monitoring a temperature of the quantity of the fluid; and discharging the quantity when a predetermined condition on the heating of the fluid is satisfied.

Preferably, the predetermined condition is satisfied when the temperature of the quantity of the fluid reaches a selected level. Alternatively or additionally, the predetermined condition is satisfied when a predetermined period of time has elapsed since beginning the heating.

There is furthermore provided, in accordance with a preferred embodiment of the present invention, vehicle windshield de-icing apparatus including: a plurality of individual heating units; and a multi-jacketed housing wherein each jacket surrounds one of the heating units, the jackets being interconnected by fluid conduits, including an inlet and outlet port, the housing being connected at the inlet port to a windshield washer fluid source and at the outlet port to a windshield spray head, the heating units being operated to heat the washer fluid during flow to the windshield spray head, the heated sprayed fluid providing a windshield de-icing effect.

There is additionally provided, in accordance with a preferred embodiment of the present invention, an electrically powered windshield de-icing device for vehicles, including a heatable container for windshield washing fluid connectable between a washing fluid reservoir and a spray heads opposite the windshield, and provided with an inlet port and an outlet port for the fluid, and having an electric heater element disposed inside the heatable container, the remaining liquid capacity of the heatable container not exceeding 300 ml, the heater element being connectable to the vehicle battery and being sized to heat the fluid contained in the heatable container to de-icing temperature within no more than one minute of actuation.

The present invention will be more fully understood from the following detailed description of the preferred embodiments thereof, taken together with the drawings in which:

BRIEF DESCRIPTION OF THE DRAWINGS

FIG. 9 is a perspective view of a heatable vessel for use in windshield cleaning apparatus, in accordance with still another preferred embodiment of the present invention;

FIG. 10 is an electrical schematic diagram showing the connection of heating units in the vessel of FIG. 9, in accordance with a preferred embodiment of the present invention;

FIGS. 17A–L are schematic illustrations showing operation of the vessel of FIG. 15 and the apparatus in which the vessel is used, in accordance with a preferred embodiment of the present invention.

DETAILED DESCRIPTION OF PREFERRED EMBODIMENTS

Figure 1:
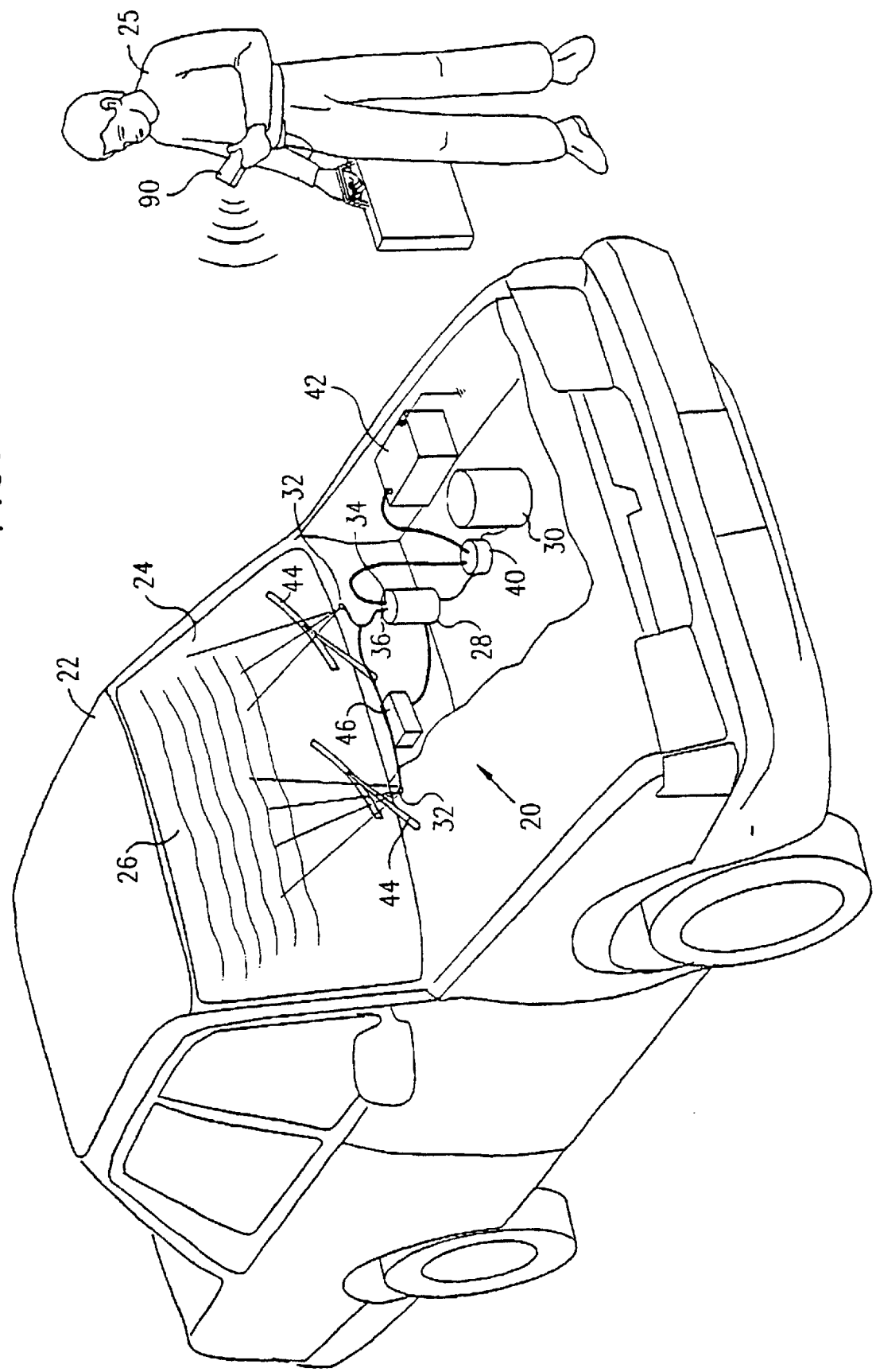
FIG. 1 is a schematic, pictorial illustration showing apparatus for cleaning a windshield of an automobile with heated washing fluid, in accordance with a preferred embodiment of the present invention.

Reference is now made to FIG. 1, which is a schematic pictorial illustration showing electrically powered window de-icing and cleaning apparatus 20 for vehicles, in accordance with a preferred embodiment of the present invention, shown assembled for use in an automobile 22 having a windshield 24 coated with ice 26.

A heatable vessel 28 for windshield washing fluid is connected between a washing fluid reservoir 30 of automobile 22 and spray heads 32, which spray the fluid onto windshield 24 when actuated by an operator 25 of the automobile. The operator may actuate the apparatus either from inside or outside automobile 22, as shown in the figure and described further hereinbelow. Vessel 28 has an inlet port 34, which receives washer fluid from reservoir 30, and an outlet port 36 through which heated fluid is discharged to spray heads 32. The fluid is driven by a pump 40, which is generally already present in automobile 22 for spraying unheated fluid to clean windshield 24. A battery 42 provides power to apparatus 20, and wipers 44 clean melted ice and dirt from the windshield, as is known in the art. A controller 46 regulates the operation of apparatus 20, and optionally also controls wipers 44 in conjunction with operation of the apparatus. Other aspects and details of the apparatus are described further hereinbelow.

Figure 2:
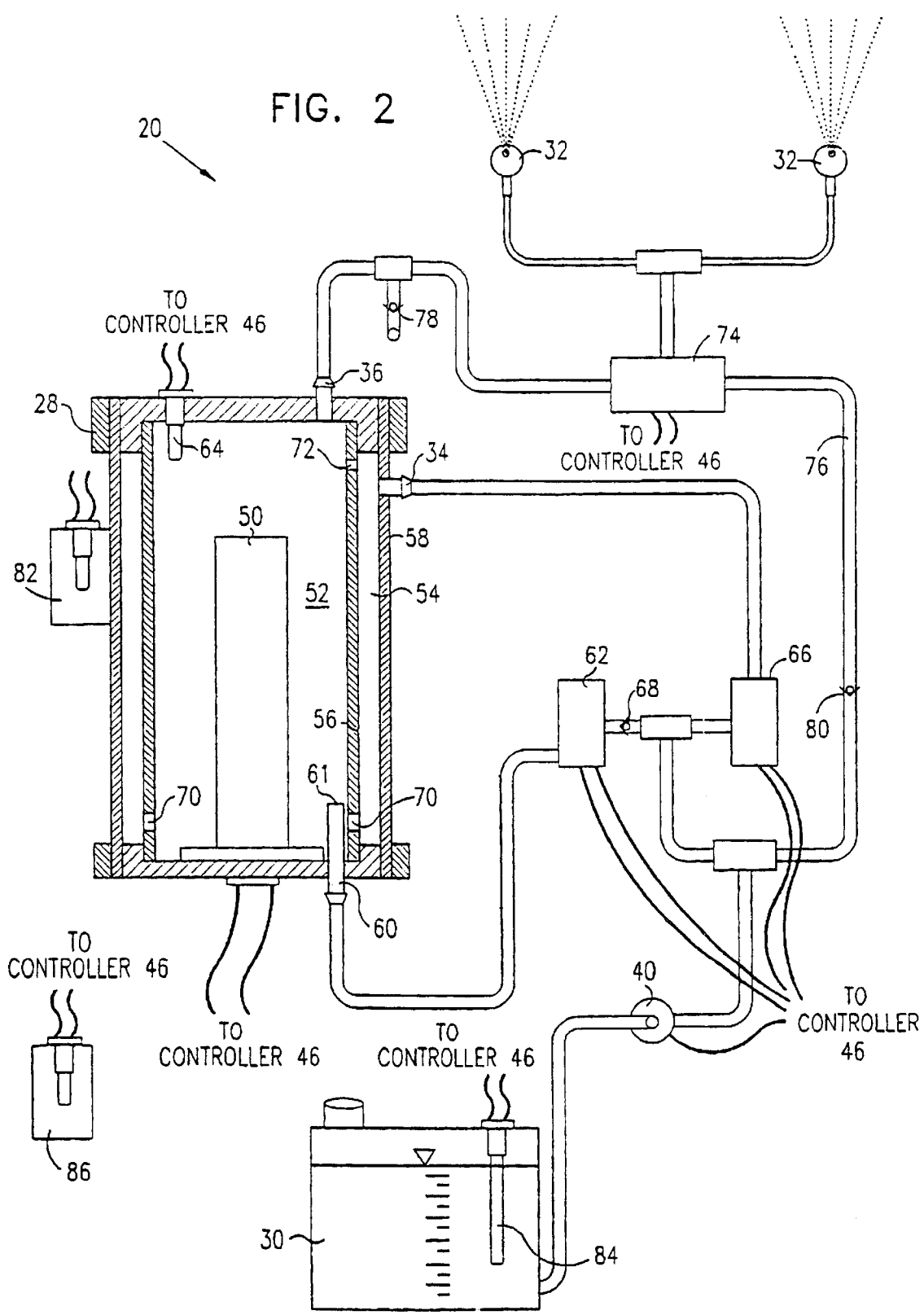
FIG. 2 is a schematic diagram showing details of the cleaning apparatus of FIG. 1, in accordance with a preferred embodiment of the present invention.

FIG. 2 is a schematic, partly sectional diagram showing details of vessel 28 and other elements of apparatus 20, in accordance with a preferred embodiment of the present invention. Vessel 28 is generally cylindrical in shape and comprises an inner chamber 52 surrounded by an outer chamber 54. Inner chamber 52 is contained and defined by an inner wall 56, preferably comprising a metal such as stainless steel. Outer chamber 54 is surrounded by an outer wall 58 of the vessel, preferably comprising an insulating material, such as a plastic. A heating element 50 inside inner chamber 52 heats the fluid in vessel 28. As a result of the concentric arrangement of chambers 52 and 54, heat losses from vessel 28 are minimized, since heat lost by the hot fluid in chamber 52 is used largely to pre-heat the colder fluid in chamber 54. Since the fluid in chamber 54 is cooler, its heat losses through outer wall 58 are relatively small.

Heating element 50 preferably comprises a resistively-heated electrical element, which is powered by battery 42 via controller 46, in accordance with a heating sequence described further hereinbelow. Alternatively or additionally, element 50 may be heated by exchange of heat with a heat source in automobile 22, such as the engine cooling fluid or exhaust. Electrical heating by battery 42 is advantageous, however, since it allows vessel 28 to be heated rapidly even before the automobile is started. Preferably, element 50 draws approximately 400 W, which typical automobile batteries can supply easily. Moreover, vessel 28 is preferably sized so that within about one minute or less of actuation, it is capable of heating and discharging fluid of a volume and temperature sufficient to melt ice 26. For this purpose, inner chamber 52 preferably contains about 50 ml of the fluid. It will be appreciated, however, that the principles of the present invention may similarly be applied by scaling the volume of vessel 28 and the power of element 50 to any required capacity. In particular, when apparatus 20 is used in larger vehicles, such as trucks or boats, the volume and power draw of the vessel will typically be substantially larger than in automobile 22.

When operator 25 of vehicle 22 actuates apparatus 20, controller 46 allows current from battery 42 to flow in heating element 50, so that vessel 28 begins to heat up. Any fluid in the vessel is preferably allowed to drain out through a drain port 60, by opening a drain valve 62. Valve 62, like other valves used in apparatus 20, as will be described hereinbelow, preferably comprises a solenoid valve, of any suitable type known in the art, which is controlled by controller 46. The controller preferably applies a relatively high initial current to open the valve, but then reduces the current to a lower level to hold the valve open. Thus, element 50 preheats the vessel, including particularly inner wall 56. The heat that builds up in the vessel tends to vaporize fluid remaining therein, generating pressure that forces the fluid out through port 60, regardless of whether vessel 28 is positioned higher or lower than reservoir 30. Preferably, a temperature sensor 64 measures the temperature in vessel 28 and provides feedback to controller 46.

After the vessel has reached a desired temperature, preferably with heating element 50 reaching a temperature of several hundred degrees centigrade, drain valve 62 is closed and an inlet valve 66 is opened. Alternatively, the valves may simply be opened after a predetermined time has elapsed, since the presence of a residual amount of fluid at the bottom of vessel 28 will effectively prevent severe overheating of the vessel. Pump 40 is operated to convey an initial quantity of washing fluid, preferably between 30 and 50 ml, from reservoir 30 to inlet port 34. A one-way valve 68 preferably prevents back-flow of the fluid toward drain port 60. An outlet valve 74 is preferably a three-way valve, i.e., of a type having two inlets and a single outlet (in which fluid may also enter through the outlet and flow back to the inlets), enabling either of the inlets to be in communication with the outlet. Valve 74 is set to allow flow from outlet port 36 to spray heads 32, and to block flow through a bypass line 76. Alternatively, separate valves may be provided for the outlet and bypass line.

The fluid fills outer chamber 54 and flows into inner chamber 52 through openings 70 in inner wall 56. An additional opening 72 near the top of wall 56 aids in pressure equalization between the inner and outer chambers. Upon contact with the hot element 50 and wall 56, the fluid is rapidly heated, causing a portion of the fluid to vaporize. The pressure of the vaporization forces the hot fluid out through outlet port 36 and spray heads 32, at an elevated temperature and pressure. Optionally, outlet valve 74 is held closed even after opening inlet valve 66, and is opened only after sufficient pressure has built up in vessel 28, either autonomously or operated by controller 46. The hot, pressurized fluid not only facilitates rapid melting of ice 26 on windshield 24, but also is capable of blowing out blockages in fluid lines between outlet port 36 and spray heads 32 that may be caused by ice or dirt. Preferably, a one-way valve 78 shunts outlet port 36 to ambient air so as to relieve vacuum conditions that may arise.

After the initial quantity of heated fluid has been discharged, pump 40 and inlet valve 66 are operated to refill vessel 28. Although heating element 50 and wall 56 are no longer as hot as they were before the initial quantity of the fluid was introduced into the vessel, they still retain some residual heat, facilitating rapid heating of the refilled fluid. When the refilled fluid reaches a desired temperature and/or after a predetermined period of time, it is discharged through valve 74 and spray heads 32. This process is repeated a desired number of times in sequence, until an entire sequence of discharges has been completed, as described hereinbelow, or until the windshield has been cleaned and/or de-iced, or until the temperature in vessel 28 drops below a predetermined minimum, or until it is interrupted by operator 25. (It is noted that under normal conditions, the temperature of the vessel will generally decrease from one quantity to the next in the sequence. If controller 46 receives an indication of an increase in the temperature, such an increase will generally be indicative of a malfunction, for example, a failure of fluid to refill the vessel, and the controller will preferably interrupt the power supplied to element 50.) The driver may then again actuate apparatus 20 and begin a new cycle of heating and fluid discharge.

Preferably, each time vessel 28 is refilled, heated fluid is discharged through the spray heads for about 3 sec, at intervals of about 5 sec or longer between fills, generally as determined by the time needed for the fluid to reach a desired temperature. The temperature of later discharges in the sequence may be less than that of the initial and other earlier discharges. Further preferably, wipers 44 are operated in cooperation with the discharge of fluid from apparatus 20, so that the wipers go on only during and shortly after the fluid discharge. Optionally, wiper operation may be delayed, so that the wipers do not operate during the initial discharge, when ice 26 has not yet melted, but only start from the second and subsequent discharges.

After the sequence of discharges of heated fluid is completed, valves 66 and 74 are closed (relative to vessel 28), and drain valve 62 is preferably opened, so that any fluid remaining in the vessel can drain back into reservoir 30. (Pump 40 is generally not sealed against back-flow.) An upper end 61 of drain port 60 is preferably elevated relative to the bottom of chamber 52, so that a minimal amount of fluid will be left in vessel 28 even after draining. The vessel is then ready for rapid operation the next time apparatus 20 is actuated.

Bypass line 76 allows unheated fluid from reservoir 30 to be pumped directly to spray heads 32, without passing through vessel 28. Line 76 is open to the spray heads whenever valve 74, which is preferably a three-way valve, as noted above, is closed relative to outlet port 36. Line 76 can be used in warm weather, when de-icing is not needed, or when a cleaning spray is needed immediately, and there is not time to heat the fluid. Preferably, valve 74 remains open relative to line 76, so that fluid from the line is conveyed to spray heads 32, whenever the heating apparatus is not actuated. A one-way valve 80 in line 76 preferably blocks any back-flow of fluid through the line.

Apparatus 20 thus provides additional window-cleaning functionality for automobile 22, at relatively low cost and without interfering with pre-existing window washing capabilities. The apparatus may either be installed as part of the window washing system in a new automobile, or it may easily be retrofitted into an existing washing system. Although the parts of apparatus 20 are shown in FIGS. 1 and 2 as being in certain positions and orientations relative to automobile 22 and the washing system therein, other positions and orientations are clearly possible. For example, vessel 28 may be placed at a different angle from the orientation shown in the figures, as long as ports 34, 36 and 60 are suitably positioned and oriented in the vessel.

Although in the preferred embodiment shown in FIG. 2, apparatus 20 includes valves 62, 66 and 74 controlling ports 60, 34 and 36 of vessel 28 in a certain fluid flow configuration, it will be understood that other configurations may also be used. In particular, it is not necessary to use all three valves. For example, valves 66 and 74 may be dispensed with, along with line 76, and pump 40 used to drive and control the fluid flow through vessel 26. Furthermore, although the parts of apparatus 20 are shown, for the sake of clarity, as separate units connected by tubing, in actuality at least a portion of the apparatus is preferably constructed as a block, to minimize heat losses. Furthermore, in such a configuration, cold washing fluid can be made to pass near the solenoid valves, removing the heat therefrom and increasing the efficiency of the fluid heating process. It will be appreciated that in any case, because apparatus 20 is largely closed and operates in a series of short heat/fill/discharge cycles, any leakage or fluid loss will generally have only a minimal effect on its operation.

Control of apparatus 20 by controller 46 is described hereinabove as being based on feedback to the controller provided by sensor 64. This sensor is shown in FIG. 2 as being placed at the upper end of vessel 28, where it will measure the temperature either of vapor or fluid in chamber 52, depending on whether the chamber is empty or filled. Controller 46 preferably tracks and monitors changes in temperature sensed by sensor 64 during heat/fill/discharge cycles of vessel 28. If the temperature exceeds a predetermined maximum, or if temperature changes do not follow a predetermined normal profile, the controller will conclude that a malfunction has occurred, such as blockage of inlet 34 or outlet 36 or a failure of sensor 64, and will preferably interrupt operation of the apparatus and notify operator 25 by an appropriate signal.

In addition or alternative to sensor 64, there may be a temperature sensor nearer the bottom of the vessel, to measure the fluid temperature therein. Other sensors, such as a pressure sensor or pressure-stat or a fluid level sensor, may also be fixed in the vessel and provide feedback to controller 46. Further temperature sensors may also be used, including a sensor 82 on an outer surface of vessel 28, a sensor 84 in reservoir 30 for measuring the temperature of fluid therein, and a sensor 86 on an outer surface of automobile 22, most preferably on windshield 24. These sensors provide inputs to controller 46, which accordingly sets parameters such as the voltage applied to element 50 and/or the lengths of time for which the element and fluid in vessel 28 are heated.

Preferably, the controller sets the parameters so that the fluid is sprayed onto windshield 24 at a temperature high enough to melt ice 26 quickly under prevalent ambient conditions, as indicated by sensor 86, for example, but not so high (relative to the temperature of the windshield) as to create a danger of cracking the windshield or violating safety regulations in this regard. The selection of the parameters is preferably automatic, without requiring intervention by operator 25 of automobile 22, except to actuate or de-actuate apparatus 20 as desired.

Figure 3:
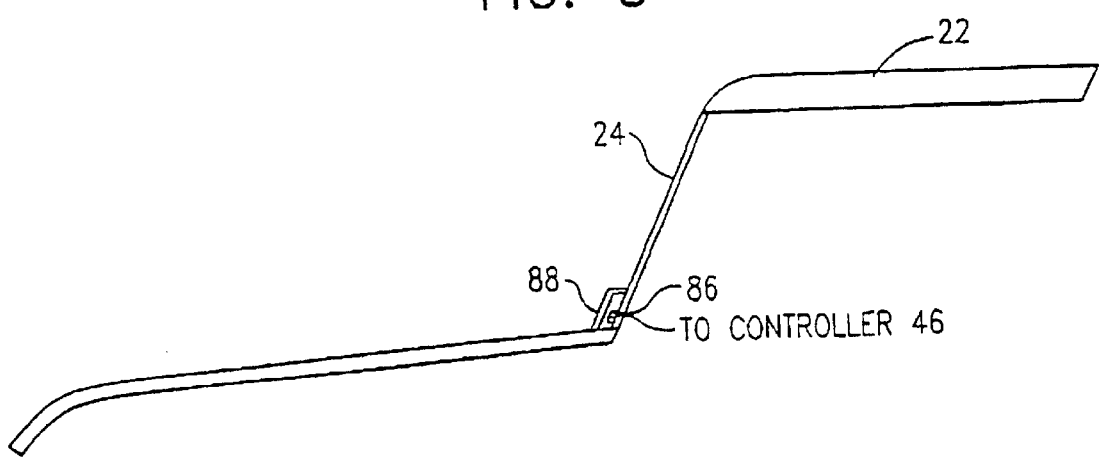
FIG. 3 is a schematic illustration showing a temperature sensor on the windshield of the automobile of FIG. 1, in accordance with a preferred embodiment of the present invention.

FIG. 3 is a schematic illustration showing positioning of temperature sensor 86 on windshield 24, in accordance with a preferred embodiment of the present invention. In order for controller 46 to determine accurately to what temperature the fluid should be heated, it is necessary to know the temperature of the outer surface of windshield 24. If sensor 86 is placed openly on the windshield and exposed to the sun, however, it will typically read a higher temperature than that of the transparent windshield itself. Therefore, sensor 86 is preferably covered by a reflective cover 88, thus largely neutralizing the effect of solar radiation on the temperature reading.

When operator 25 is in automobile 22, he or she actuates apparatus 20 either by means of a switch on the dashboard or by signaling controller 46 using an exiting wash/wipe switch already present in the automobile. For example, the operator may press or pull the existing switch two or three times in rapid succession to turn apparatus 20 on or off.

In addition, as illustrated in FIG. 1, operator 25 may use an optional remote control 90 to actuate apparatus 20 before getting into automobile 22. Remote control 90 may also be used to initiate automatic operation of wipers 44, and thus to clean and de-ice windshield 24. The remote control may be of any suitable type known in the art, including either an active device, such as a RF transmitter, or a passive device, such as an optical or infrared retroreflector. By actuating the apparatus before getting into the automobile, the operator can reduce the length of time spent waiting for the fluid to heat up.

Figure 4:
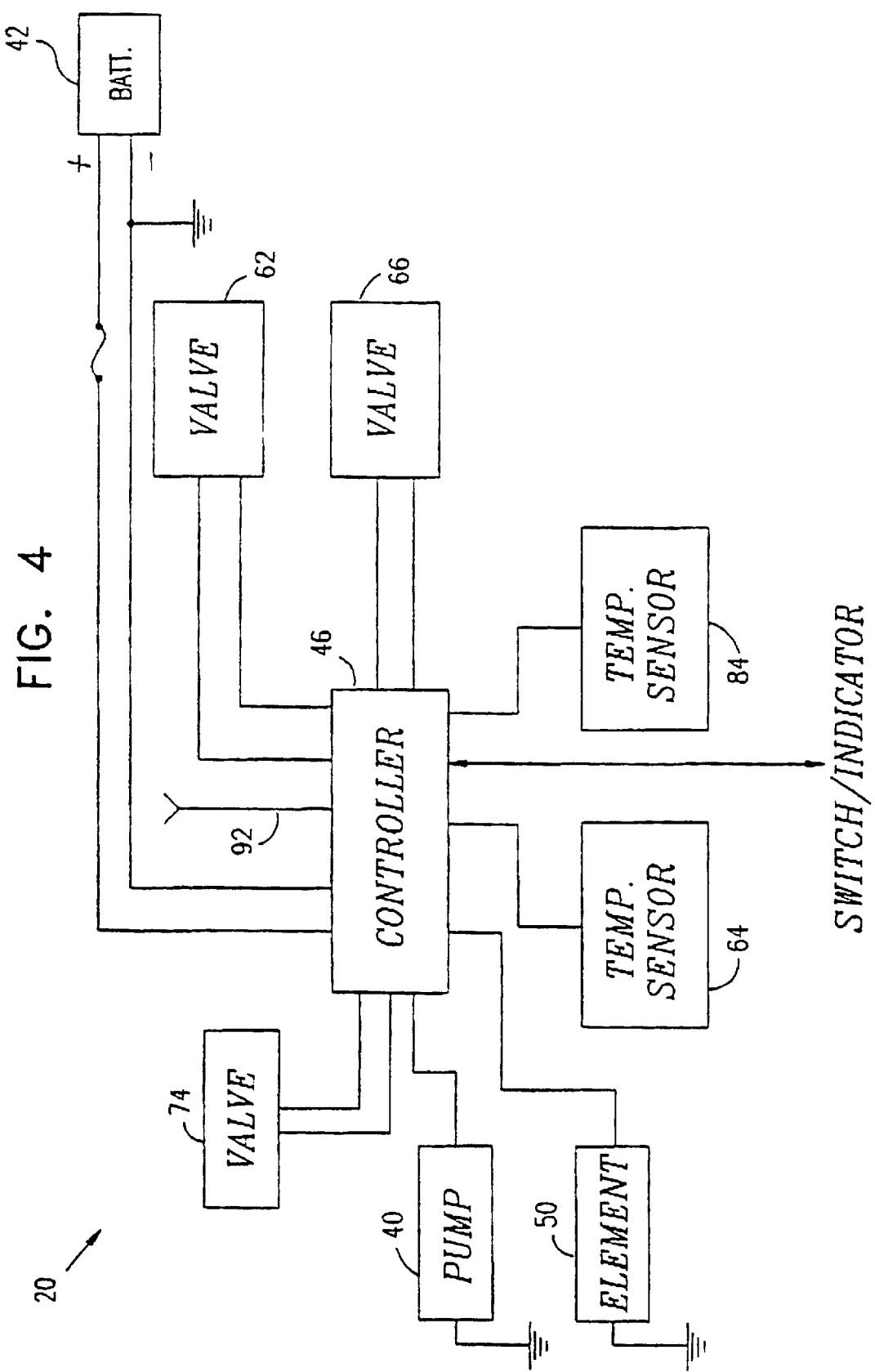
FIG. 4 is a schematic block diagram illustrating the functions of an electronic controller in the apparatus of FIG. 1, in accordance with a preferred embodiment of the present invention.

FIG. 4 is a schematic block diagram illustrating the operation of controller 46 in apparatus 20, in accordance with a preferred embodiment of the present invention. Controller 46 is preferably coupled to an antenna 92, for receiving signals from remote control 90. As described hereinabove, the controller receives signals from temperature sensor 64, as well as other sensors, such as sensor 84. It also receives electrical power from battery 42 and distributes the power, preferably by means of relays (not shown), to valves 62, 66 and 74 and to pump 40 and heating element 50.

Antenna 92 can also be used to allow wireless control of apparatus 20 when operator 25 is inside the car, so that there is no need to connect additional wires and switches on the dashboard of automobile 22. Alternatively, controller 46 may be connected by wire to an operating switch and indicator lamp (not shown in the figures), by means of which the operator actuates apparatus 20 and is notified of its proper operation or, possibly, malfunction.

Before providing power to the valves, pump and heating element, controller 46 preferably performs a self-test. The test includes measurement of input voltage from battery 42 (which must preferably be at least 9 volts for a typical automobile 22 having a 12-volt battery), as well as checking that the electrical resistance of heating element 50 is within predetermined bounds. If any part of the self-test fails, controller 46 will not allow apparatus 20 to operate, and will preferably provide a malfunction indication to operator 25.

Figure 5:
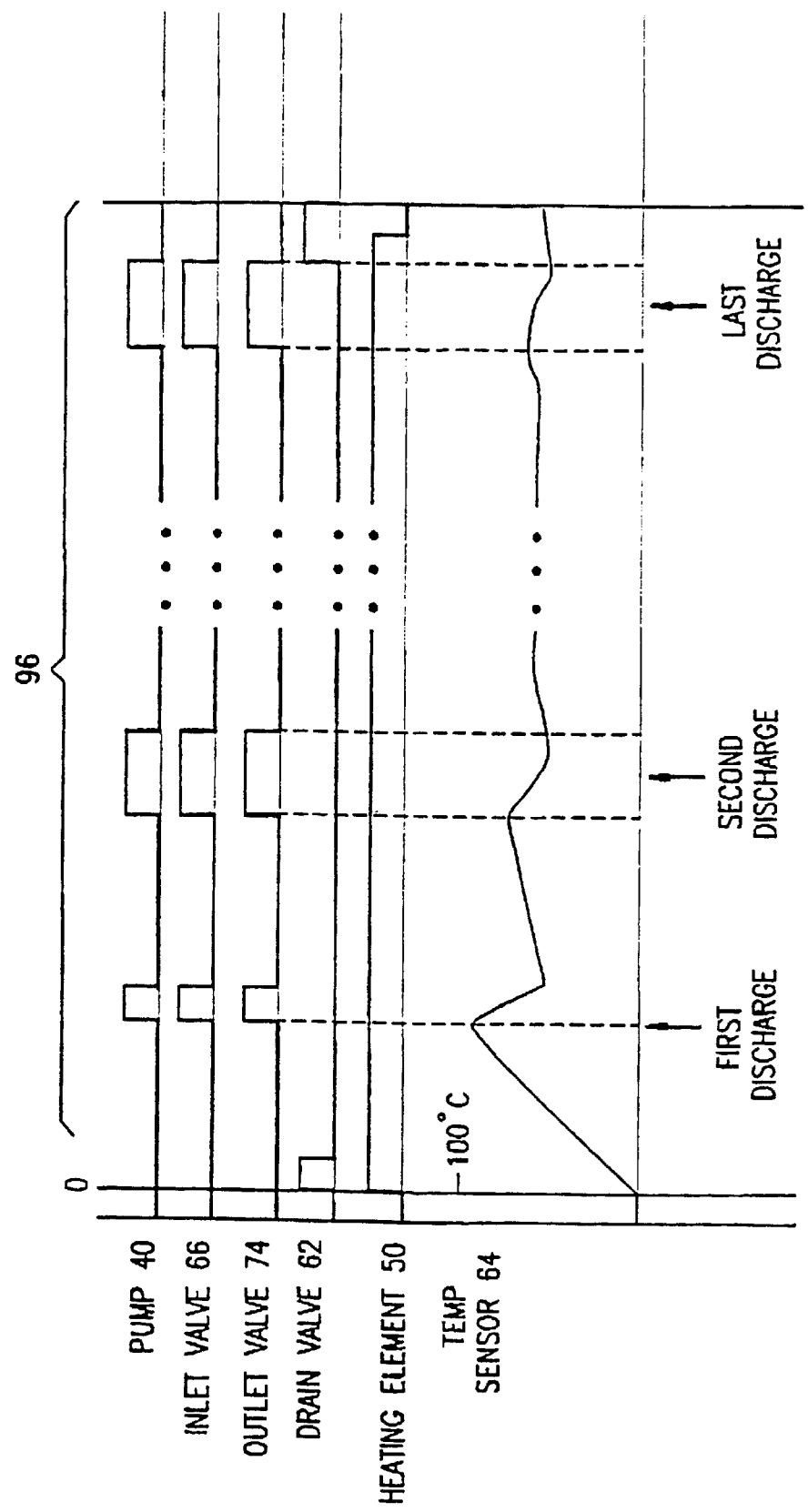
FIG. 5 is a timing diagram illustrating operation of the apparatus of FIG. 1, in accordance with a preferred embodiment of the present invention.

FIG. 5 is a timing diagram illustrating a sequence 96 of heat/fill/discharge cycles of apparatus 20, in accordance with a preferred embodiment of the present invention. Initially, as described hereinabove, drain valve 62 is opened and heating element 50 is energized to pre-heat vessel 28. Valve 62 is closed, preferably after about 15 sec. Alternatively, the drain valve may be held closed for a short period, preferably about 20 sec, so that the fluid in vessel 28 is heated to a high temperature before the valve is opened. This alternative is particularly useful if controller 46 determines that one of the valves, particularly inlet valve 66, is stuck and will not open, in which case the heated fluid is used to force the valve open.

Heating continues until sensor 64 reaches a target temperature, preferably about 85° C. (dependent on the exact position of the sensor), in chamber 52, or for about 70 sec, if the temperature does not reach the target temperature. At that point, pump 40 and inlet and outlet valves 66 and 74 open, to admit and discharge the initial quantity of fluid. The temperature in chamber 52 drops, and is subsequently reheated, preferably to about 60° C., whereupon a second quantity of the fluid is admitted and discharged. The process of reheating, fill and discharge continues for a predetermined number of cycles, or until terminated by operator 25.

After the final discharge in sequence 96, drain valve 62 is opened, and heating element 50, which is energized substantially continuously throughout the sequence, remains energized for about 15 see more, in order to heat and drive out of vessel 28 as much as possible of any fluid remaining therein, down to the level of upper end 61. The apparatus is then ready to begin the next sequence, when required by the user.

Figure 6:
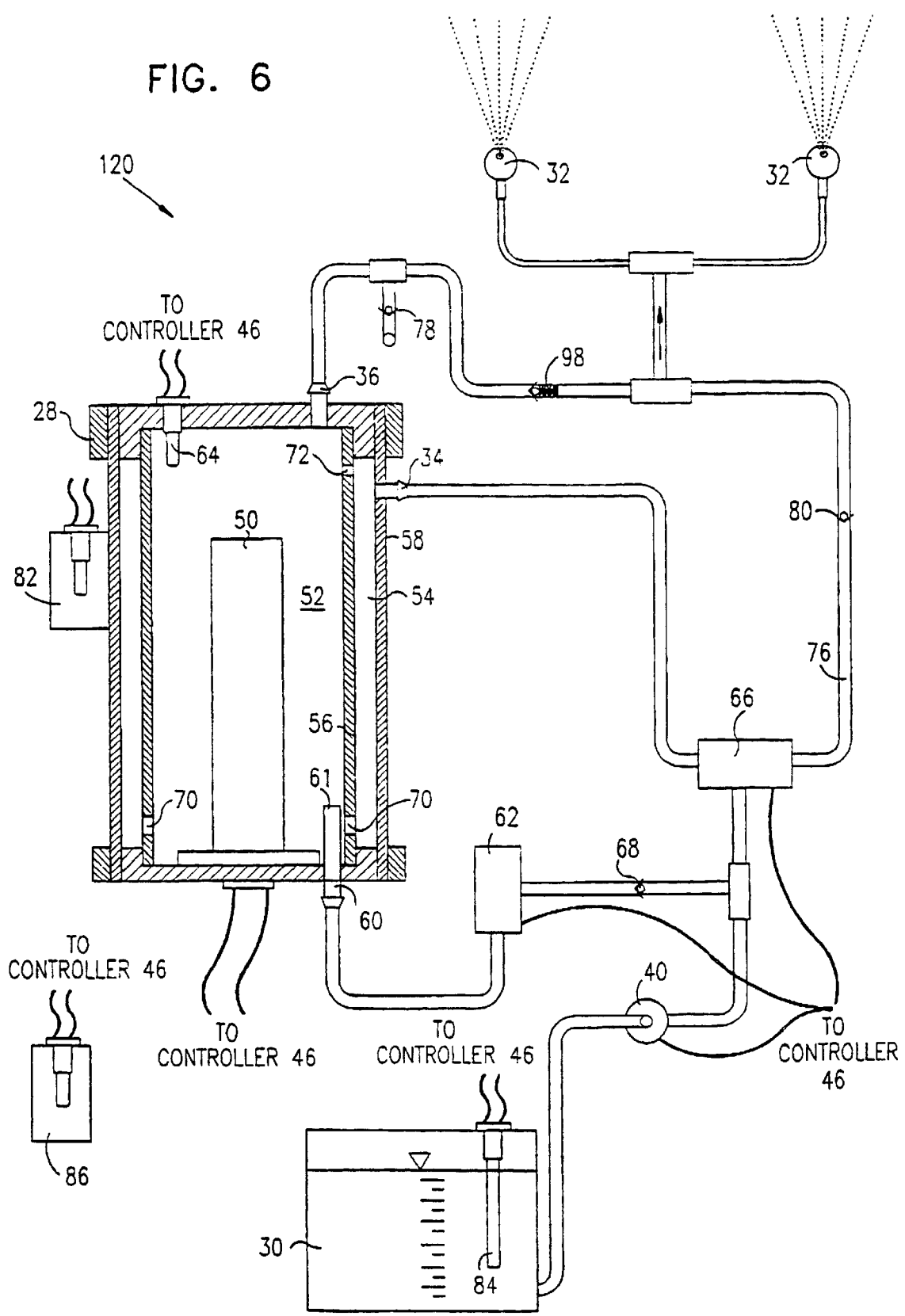
FIG. 6 is a schematic diagram showing details of windshield cleaning apparatus, in accordance with another preferred embodiment of the present invention.

FIG. 6 is a schematic illustration showing an alternative configuration of apparatus 20, in accordance with a preferred embodiment of the present invention. Except as indicated hereinbelow, the parts of the apparatus shown in FIG. 6 are substantially similar or identical to those shown in FIG. 2 and described with reference thereto. This embodiment differs from that of FIG. 2 in that in FIG. 6, outlet valve 74 is eliminated, and inlet valve 66 is a three-way valve, as described hereinabove, which alternately connects inlet port 34 or bypass line 76 to pump 40. Instead of outlet valve 74, a one-way valve 98, preferably a spring-loaded one-way valve, prevents fluid passing through bypass line 76 from flowing back through outlet 36 into vessel 28 when valve 66 is open in the direction of the bypass line. On the other hand, when valve 66 is open in the direction of inlet port 34, the resultant pressure in vessel 28 forces valve 98 open, so that heated fluid is discharged through spray heads 32.

Figure 7:
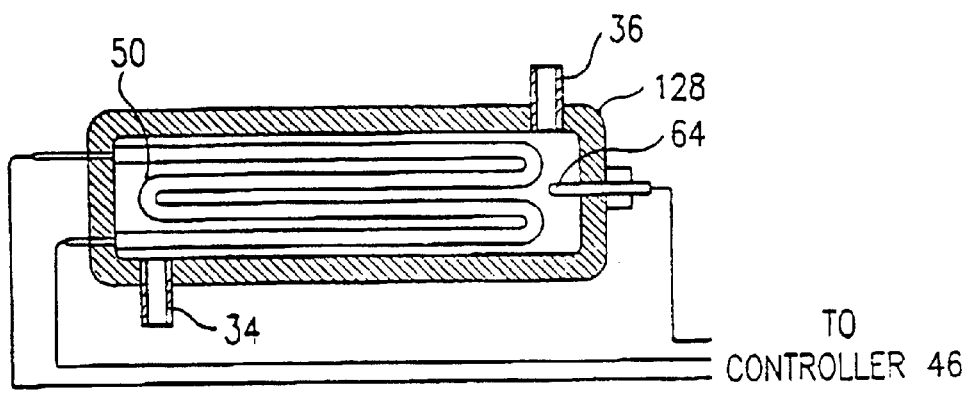
FIG. 7 is a sectional view of a heatable vessel for use in windshield cleaning apparatus, in accordance with a preferred embodiment of the present invention.

Referring now to FIG. 7, there is seen in a sectional view a heatable vessel 128 for use in apparatus 20, in accordance with an alternative embodiment of the present invention. Although the structure of vessel 128 is somewhat different from that of vessel 28, it may be used in a substantially similar manner. Outlet port 34 may in this case also be used as a drain port.

Figure 8:
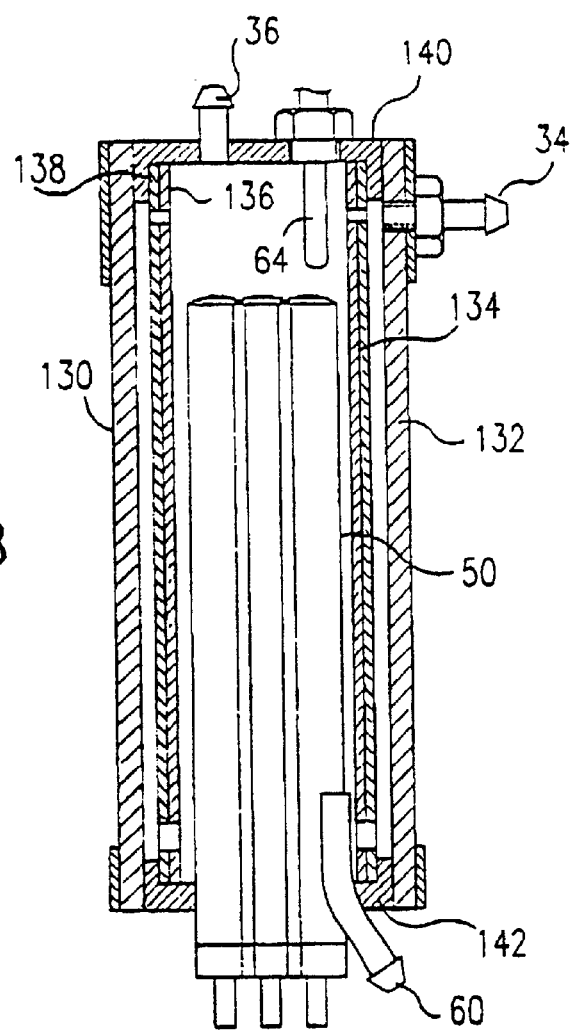
FIG. 8 is a sectional view of a heatable vessel for use in windshield cleaning apparatus, in accordance with another preferred embodiment of the present invention.

FIG. 8 illustrates another heatable vessel 130 of cylindrical form, in accordance with a preferred embodiment of the present invention. Advantageously vessel 130 has an outer enclosure 132 made of a rigid plastic tube, forming one of two spaced-apart walls. An inner wall 134 comprises a plastic tube 136 inside a metal tube 138. Metal tube 138 is preferably made of stainless steel which, being a poor heat conductor among metals, reduces heat losses. Plastic tubes 132 and 136 are made of a material which has a wide temperature operating range, for example polyetheretherketone or polyphenylene sulfide. Using a pair of end-caps 140 and 142 which are epoxy filled, tubes 132, 136 and 138 are easily held in alignment. The embodiment shown is particularly useful for manufacturing moderate quantities without incurring high tooling costs.

Inlet port 34 and outlet port 36 comprise nipples for the respective attachment of the ends of plastic tubes (seen generally in FIGS. 1 and 2) used for connecting between washing fluid reservoir 30 and spray heads 32, which is preferably divided by cutting during installation of apparatus 20. Drain port 60 allows fluid to return to reservoir 30 after the apparatus has been used, as described hereinabove.

In the embodiment shown in FIG. 8, heating element 50 is a combination of three electric resistance elements, which are connected in parallel. A single burnt-out element will thus allow the device to continue to function, though at reduced power.

Referring now to FIG. 9, there is shown a perspective view of another heatable vessel 150 for use in apparatus 20, in accordance with a preferred embodiment of the present invention. A terminal 152 is connected internally to a set of heating units (shown in FIG. 11), each having an outer jacket through which the washer fluid passes. The negative, or ground connection of vessel 150 is made directly to the body of the heating units mounted therein, via a bridge connector 154 and a retaining band (not shown) which secures vessel 150 to automobile 22. Insulation material 156 provides the vessel with thermal insulation, typically by a lightweight, low conductivity material.

As will be further described with reference to the figures that follow, vessel 150 includes three separate, individual heating units, each located in a housing jacket through which fluid flows from washer fluid reservoir 30 to windshield spray heads 32. By a novel arrangement of the heating units and fluid jackets, the fluid is pre-heated during flow and is re-circulated to obtain the maximum effective temperature when exiting as a jet from the spray heads. The heating units are electrical and designed to provide sufficient heat capacity such that during fluid flow in the system, a sufficient temperature is immediately reached. Thus, the inventive design is effective in providing a washer fluid system for de-icing of windshield 24, without requiring a long delay as with prior art systems based on vehicle engine heat. Unlike prior art systems, no pre-heating of the washer fluid is required, and the capacity of immediate hot washer fluid is limited only by the size of the fluid reservoir. The inventive unit uses the existing washer technology, hoses and power source. Because vessel 150 is designed to provide a substantially continuous flow of fluid, which is heated during flow, it will typically be capable of providing a slower flow of hot fluid onto windshield 24 than the high flow rate of the bursts of hot fluid from vessel 28.

Referring now to FIG. 10, there is shown an electrical schematic diagram of the heating units' connection in vessel 150. A single 100 watt heating unit 166 is connected in parallel with two 150 watt units 162 and 164, providing a 400 W total configuration. This heating capacity achieves nearly instant heating of the washer fluid. In this fashion, there is no significant time delay from windshield washer system operation until exit of hot spray. This is because the heating is achieved during fluid flow in the system, without changing the system flow rate and pressure. Optionally, only one or two of units 162, 164 and 166 may be used when a relatively lower temperature, and therefore less heating power, is required.

In operation, when electrical switch 168 is closed, vessel 150 operates immediately to heat the washer fluid in the system such that a hot fluid jet spray exits spray heads 32 and begins to clean windshield 24 via normal operation of wipers 44. Since the heating need not be continuous, electrical switch 168 can be an intermittent type, to periodically interrupt current. A corrosion-resistant type of electrical switch is typically used.

Other than pressing switch 168 closed, operator 25 need not do anything further, as the system operates by spraying washer fluid at approximately 50 degrees above the ambient temperature (or at another appropriate temperature, in accordance with operating conditions), and together with the wiper motion, the fluid melts and cleans the windshield of ice. Within an interval of only about 15 seconds, the windshield is normally cleaned and de-iced, and driving can begin. Re-freezing of liquid is very unlikely in this very short period.

Figure 12:
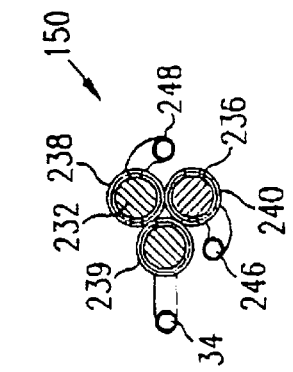
FIG. 12 is a cross-sectional view of the vessel of FIG. 11, taken along line XII—XII.
Figure 11:
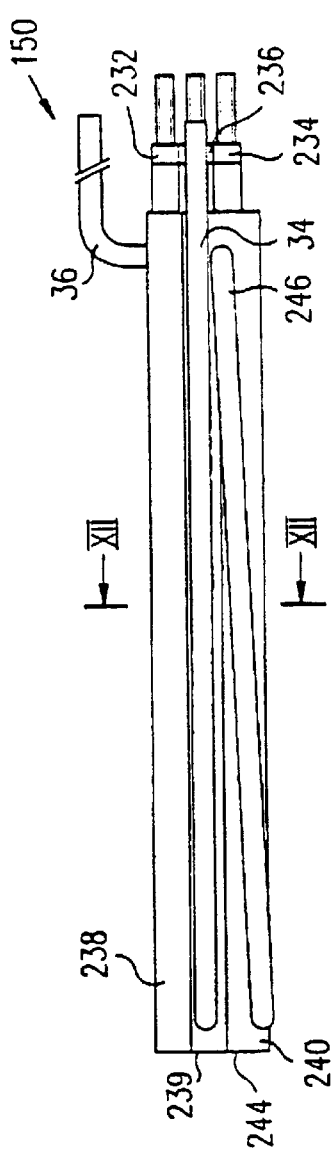
FIG. 11 is a side view of an internal portion of the vessel of FIG. 10, in accordance with a preferred embodiment of the present invention.

Referring now to FIGS. 11 and 12, there are shown, respectively, a side view and a sectional view of the internal portion of vessel 150, in accordance with a preferred embodiment of the present invention. Vessel 150 contains a set of three heating units 232, 234 and 236. Each of heating units 232–236 is typically provided as a resistance load heater, as shown in the schematic diagram of FIG. 10. Individual outer jackets 238, 239 and 240 are constructed around each of heating units 232–236 so that each surrounds its own internal heating element, to enable washer fluid to quickly absorb heat during flow in the outer jackets 238–240.

As stated above, the heating units are designed for 12-volt operation and are provided as sealed, corrosion-resistant units. Alternatively, the units may be designed to operate at 24 volts, or any other suitable DC or AC voltage. Their dimensions are so as to define an annular flow passage (see FIG. 13A) between each unit and its outer jacket, of dimensions which enable maintenance of the desired system fluid pressure, as set by the vehicle manufacturer.

Fluid inlet pipe 34 is constructed so as to extend alongside the entire length of heating units 232–236, and is connected to outer jacket 239 of heating unit 234 at its lower end 244. This construction provides a pre-heating function, such that the washer fluid flowing in pipe 34 absorbs heat energy emitted by heating units 232–236 before entering outer jacket 239.

The flow of washer fluid through jacket 239 causes it to be heated by heating unit 234, by absorbing heat from the heating element. Once the washer fluid has reached the top of jacket 239, it flows via a connecting tube 246 and re-enters vessel 150 at the lower end of outer jacket 240, so as to be heated during flow therethrough by heating unit 236. Upon reaching the top of jacket 240, the washer fluid is again directed via a connecting tube 248 so as to re-enter vessel 150 at the lower end of outer jacket 238.

At the top of outer jacket 238, there is connected fluid outlet pipe 36, through which the washer fluid exits vessel 150 after flowing through outer jacket 238 and being heated by heating unit 232. Thus, after the passage through outer jackets 239–240, the washer fluid is provided with the maximum possible heat level before flowing to spray heads 32 mounted opposite windshield 24. Spray heads 32 may be specially-designed with an adjustable angle to direct the spray at the most effective point on the windshield.

In FIG. 12, a cross-sectional view of vessel 150 is shown, taken along section lines XII—XII in FIG. 11, revealing further construction details of heating units 232–236 and outer jackets 238–240. Fluid inlet pipe 34 and the arrangement of connecting tubes 246 and 248 is also shown The design of heating units 232–236 and outer jackets 238–240 in close proximity to each other adds to the heat efficiency of the design of the vessel.

Heat efficiency design considerations also affect the choice of materials to be used in vessel 150. For example, choice of copper or brass tubing for inlet tube 34 insures high heat conductivity, while tubes 246, 248 and 36 should be chosen of low thermal conductivity material, to ensure minimum heat loss. Tubes 34 and 36 have toothed end portions for easy connection thereto. Outer jackets 238–240 are also made from materials chosen for heat efficiency considerations, to have low thermal conductivity.

Figure 13B:
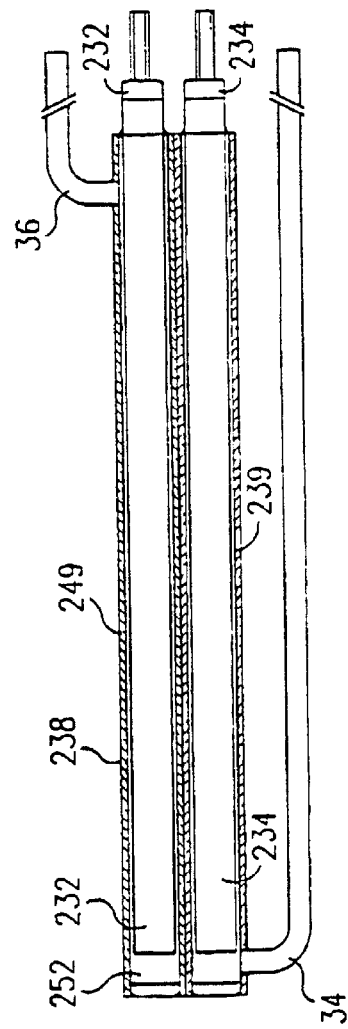
FIGS. 13A and 13B are, respectively, top and sectional side views of the vessel of FIG. 11, the sectional view taken along line XIIIB—XIIIB.
Figure 13A:
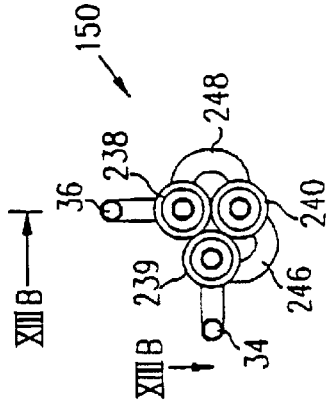

In FIGS. 13A–B, there are shown, respectively, a top view and a sectional side view of vessel 150, wherein the sectional view is taken along section lines XIIIB—XIIIB. The construction of outer jackets 238–240 is shown in details including annular flow passage 249 defined around each of heating units 232–236, and a collection chamber 252 defined at the lower end of vessel 150.

Based on the above description, the design of vessel 150 typically features a stainless steel construction of approximately 200 mm length, with each outer jacket having overall diameter of 12–13 mm and wall thickness of 1 mm. Heating units 232–236 are typically each 8 mm in diameter. The overall diameter of the vessel is approximately 51 mm. Fluid inlet pipe 34 and outlet pipe 36 are typically constructed of 3/16 inch diameter pipe. This design assures that vessel 150 is a compact, heat efficient unit which does not limit flow rates or pressures. As will be understood by those skilled in the art, various of the dimensions can be designed in accordance with existing washer system designs or particular vehicle manufacturers, to maintain the nominal flow rate and pressure of the fluid flow.

As will be appreciated by those skilled in the art, the heating of washer fluid during its flow through the system is the main advantage of vessel 150, since the heating occurs while the fluid is moving, and not while standing. The particular flow rates and design dimensions can be easily established in accordance with design techniques familiar to those skilled in the art. In addition, the choice of heating unit capacities may be increased for particular vehicles, such as trucks and buses.

Figure 14:
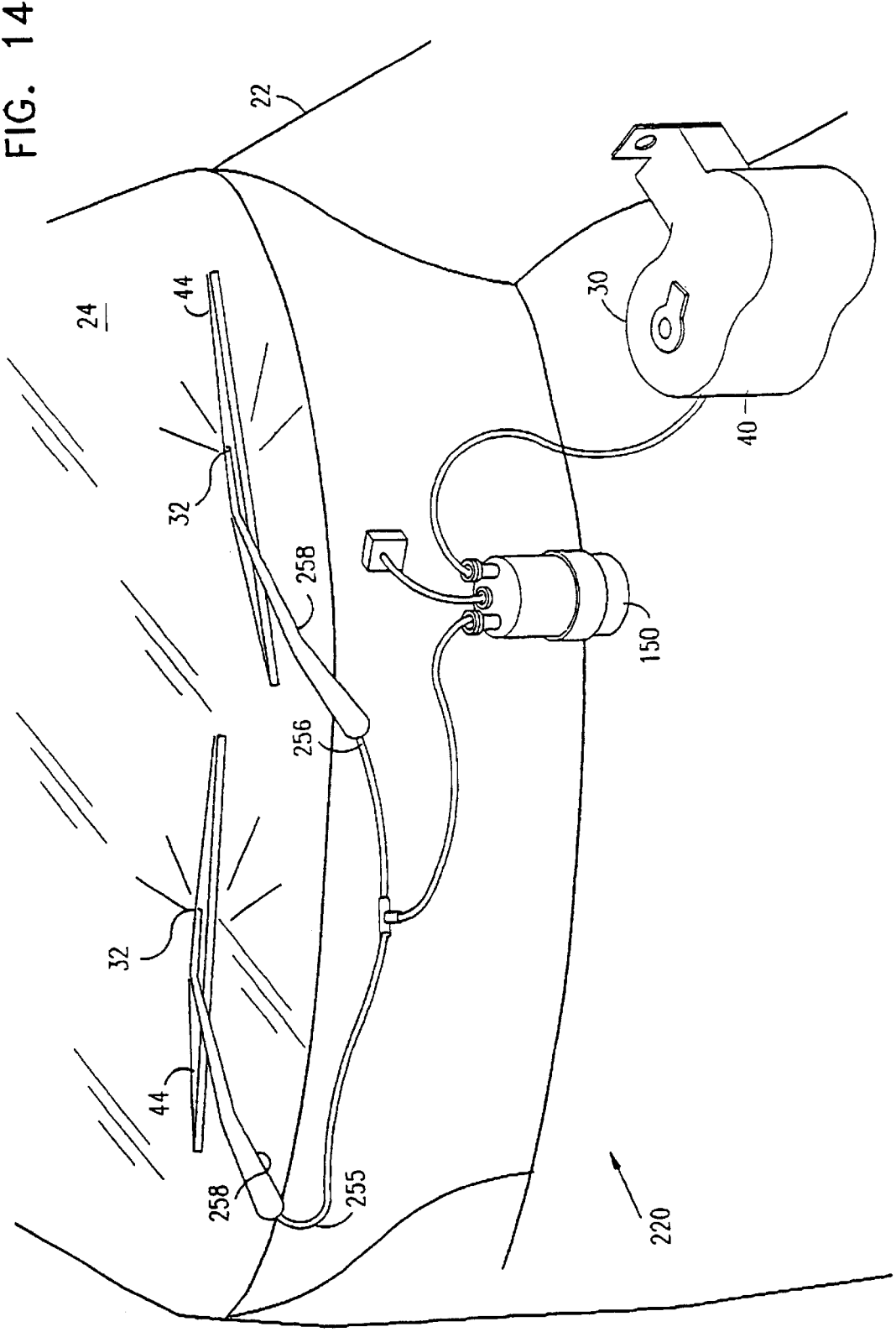
FIG. 14 is a schematic pictorial illustration showing window cleaning apparatus in an alternative configuration, in accordance with a preferred embodiment of the present invention.

Referring now to FIG. 14, there is shown an alternative installation approach for window cleaning apparatus 220, including vessel 150, in which the spray heads 32 are located on windshield wipers 44 themselves, in accordance with a preferred embodiment of the present invention In this arrangement, spray heads 32 are connected via flexible tubes 255–256, each of which is secured within a slot 258 provided on the underside of wipers 44. Thus, hot spray is delivered directly to the windshield at the location at which the greatest de-icing effect is obtained, since the wipers 44 physically break the ice. It will be understood that wipers 44 must be operated while the fluid is being sprayed from spray heads 32.

In summary, apparatus 220 of the present invention can be provided as a low-cost, easily manufactured accessory for existing windshield washer/wiper systems or it can be provided in new vehicle designs. The rugged and simple design of vessel 150 makes it an attractive add-on accessory, which provides an effective and quick solution to windshield icing problems, enhancing comfort and safety. Apparatus 220, in addition to being simple and easily installed, does not complicate the vehicle manufacturer's new car assembly line, nor does it burden existing washer systems to which it is applied, in a five-minute installation process. A manual user control existing in the vehicle is preferably used to operate the viper fluid pump.

Figure 15:
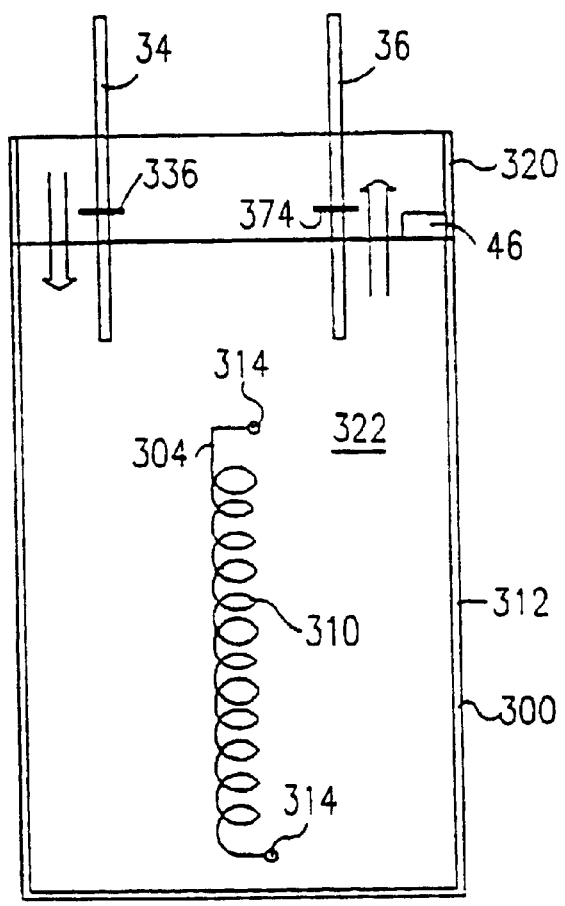
FIG. 15 is a schematic illustration of a heating vessel for use in window cleaning apparatus, in accordance with a preferred embodiment of the present invention.

FIG. 15 schematically illustrates a vessel 300, for use with apparatus 20 or 220, mutatis mutandis, in accordance with another preferred embodiment of the present invention. In vessel 300, a single jacket 312 is used to hold three separate heating elements, one of which, an element 304, is shown in the figure extending longitudinally through the vessel. Jacket 312 preferably comprises steel or other material generally cylindrical in shape and having two opposed ends. At one end, there is a cap 320 defining a chamber 322, having a volume preferably between 24 and 40 ml, depending on the size of the vehicle in which it is installed. Inlet port 34 and outlet port 36 provide communication into the chamber, although as will be described hereinbelow, at certain times washing fluid may flow in through the outlet and out through the inlet port.

Figure 16:
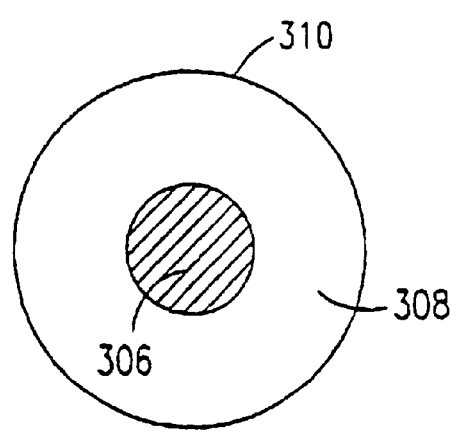
FIG. 16 is a schematic illustration showing a heating wire for use in the vessel of FIG. 15, in accordance with a preferred embodiment of the present invention.

FIG. 16 is a schematic, sectional illustration of a wire 310 from which element 304 is wound, in accordance with a preferred embodiment of the present invention. Wire 310 is substantially circular in cross section, and is formed of a magnesium oxide core 306 surrounded by a ceramic sleeve or coating 308. Preferably, the core has a diameter in the range of 0.07–0.14 mm. For example, for standard cars, a 500 W unit is sufficient, and wire 310 may have a 0.07 mm core. For larger vehicles, such as trucks, a 0.14 mm core may be necessary to generate up to 700 W of heat. Sleeve or coating 308 is preferably deposited by a standard laser process using a high-density ceramic powder, as is known in the art. Preferably, coating 308 has a thickness of about 0.10 mm.

The two ends 314 of element 304 are provided with magnesium oxide connectors, which are coupled to be powered via controller 46 as described hereinabove. In this embodiment, controller 46 preferably senses whether the motor of automobile 22 is operating, for example by detecting an AC ripple on the voltage from battery 42, and does not allow power to be provided to vessel 300 unless the motor is running, so as to avoid discharging the battery.

Cap 320 is filled with an epoxy or other material capable of withstanding high temperatures up to 700° C. In a preferred embodiment, controller 46 is contained in the cap, as shown in FIG. 15. In addition, ports 34 and 36 are provided with valves 366 and 374. These valves are preferably made of a silicone rubber and are capable of operating at high temperatures such as 700° C. The valves are coupled to controller 46 by wires (not shown in the figure) to indicate the positions of the valves and to control their operation. Valves of this kind are available from U.S. Plastics of Lima, Ohio.

FIGS. 17A–L are schematic diagrams showing states of vessel 300 and valves 366 and 374 illustrative of the operation of the vessel, in accordance with a preferred embodiment of the present invention. Prior to operation, chamber 322 in vessel 300 is empty, and the valves are open. Operator 25 gets in automobile 22, starts the engine and, in order to de-ice windshield 24, operates pump 40. The pump generates a pressure at inlet port 34. The pressure is sensed by valve 366, which automatically closes without any command from controller 46. This position is shown in FIG. 17A.

Next, valve 366 wakes up controller 46 to initiate a de-icing process. The first step of this process is to heat up element 304 by connecting battery 42 across element 304. In the absence of water in chamber 322, the chamber heats quickly to a very high temperature. The temperature of the chamber is monitored by a sensor, such as sensor 64, in the chamber. When the sensor reaches a preset level, preferably about 600° C., controller 46 opens valve 366 and after a short period closes valve 374, thus allowing washing fluid to flow into chamber 322 (FIG. 17B).

Next, the controller monitors the temperature of the fluid in the chamber. When this temperature reaches about 58° C., the controller disconnects element 304 from the battery and waits for the driver to activate pump 40 again (FIG. 17C). When the pump is activated again, the pressure is sensed by valve 366 and causes the valve to open. When the valve opens, controller 46 senses this action and causes valve 374 to open as well. The result is that hot water flows from chamber 322 through outlet 36 to windshield 24 (FIG. 17C). The initial surge is actually a mixture of hot water and steam, which causes any ice on spray heads 32 to melt and to clear the nozzles of the spray heads. Steam may also be generated in the position of FIG. 17A due to some water left over in chamber 322 from the previous operation.

After pump 40 stops the pressure pulse, valves 366 and 374 stay open, allowing water to flow back from outlet 36 through chamber 322 and out again through inlet 34 to reservoir 30 (FIG. 17E). When this back-flow stops, as sensed by valve 374, this latter valve closes (FIG. 17F). Controller 46 then forces valve 366 to close as well (FIG. 17G). Thus, an amount of fluid is trapped in chamber 322, and element 304 starts heating the fluid. When the fluid reaches 58° C., element 304 is turned off, and vessel 300 waits for the next operation of pump 40 (FIG. 17H). This operation is sensed (FIG. 17I), as described above, causing the whole process to repeat again (FIG. 17J).

Controller 46 times the interval between the last back-flow and the next pressure surge from pump 40. If over a minute is measured, and no pressure is sensed, controller 46 purges chamber 322 by first closing valves 366 and 374 (FIG. 17K) and activating element 304, to raise the fluid in the chamber to a very high temperature. Then the valves open (FIG. 17L), allowing the fluid to escape as steam. Controller 46 then powers down and waits for the next operation. A similar process may be applied to vessel 150 (shown in FIGS. 9–13B).

It will be appreciated that the preferred embodiments described above are cited by way of example, and the full scope of the invention is limited only by the claims.

What is claimed is:

1. Apparatus for cleaning a window of a vehicle, comprising:

a vessel, having an inlet through which a washing fluid is received from a reservoir and an outlet through which the fluid is discharged for cleaning the window;

a heating element for heat the fluid in the vessel;

a temperature sensor, which senses a range of temperatures in the vessel; and a valve for controlling flow of the fluid through the vessel;

characterized by said valve being in electrical communication with said temperature sensor, said valve automatically and intermittently releasing quantities of the fluid through the outlet at a desired temperature, in response to the temperate sensed by the sensor.

2. Apparatus according to claim 1, wherein a windshield wiper is activated intermittently to clean the window responsive to the intermittent release of the fluid.

3. Apparatus according to claim 1, and comprising a controller, which regulates the intermittent release of the fluid according to a given timing sequence.

4. Apparatus according to claim 3, wherein the timing sequence is varied responsive to an ambient temperature in the vehicle.

5. Apparatus according to claim 3, wherein the timing sequence is varied responsive to a temperature of an outer surface of the window.

6. Apparatus according to claim 1, wherein an initial quantity of the fluid is released at a substantially higher pressure than subsequent quantities.

7. Apply according to claim 1 and comprising a controller which regulates discharge of the fluid from the vessel responsive to the temperature sensed by the sensor, wherein the controller analyzes signals from the sensor to detect a malfunction of the apparatus and interrupts operation of the heating element when the malfunction is detected.

8. Apparatus according to claim 1, wherein the temperature sensor is fixed on an outer surface of the widow to be cleaned.

9. Apparatus according to claim 8, wherein the temperature sensor is covered by an at least partially reflective cover, so as to substantially neutralize the effect of solar radiation thereon.

10. Apparatus according to claim 1, and comprising a remote input device, which is actuated by a user of the vehicle to initiate operation of the apparatus.

11. Apparatus according to claim 1, wherein the remote input device actuates a wiper to wipe fluid from the window.

* * * * *

UNITED STATES PATENT AND TRADEMARK OFFICE
CERTIFICATE OF CORRECTION

PATENT NO. : 6,615,438 B1
DATED : September 9, 2003
INVENTOR(S) : Franco et al.

It is certified that error appears in the above-identified patent and that said Letters Patent is hereby corrected as shown below:

Column 17,
Line 31, replace "heat" with -- heating --;
Lines 34, 35 and 36, in each instance: replace "valve" with -- controller --.

Column 18,
Line 2, replace "temperate" with -- temperature --;
Lines 6-7, replace "comprising a controller, which" with -- wherein said controller--;
Line 19, replace "Apply" with -- Apparatus --;
Line 25, replace "the" with -- an additional --.
Line 26, replace "widow" with -- window --;
Line 35, replace "1" with -- 10 --.

Signed and Sealed this

First Day of June, 2004

JON W. DUDAS
*Acting Director of the United States Patent and Trademark Office*